United States Patent Office 3,116,673
Patented Jan. 7, 1964

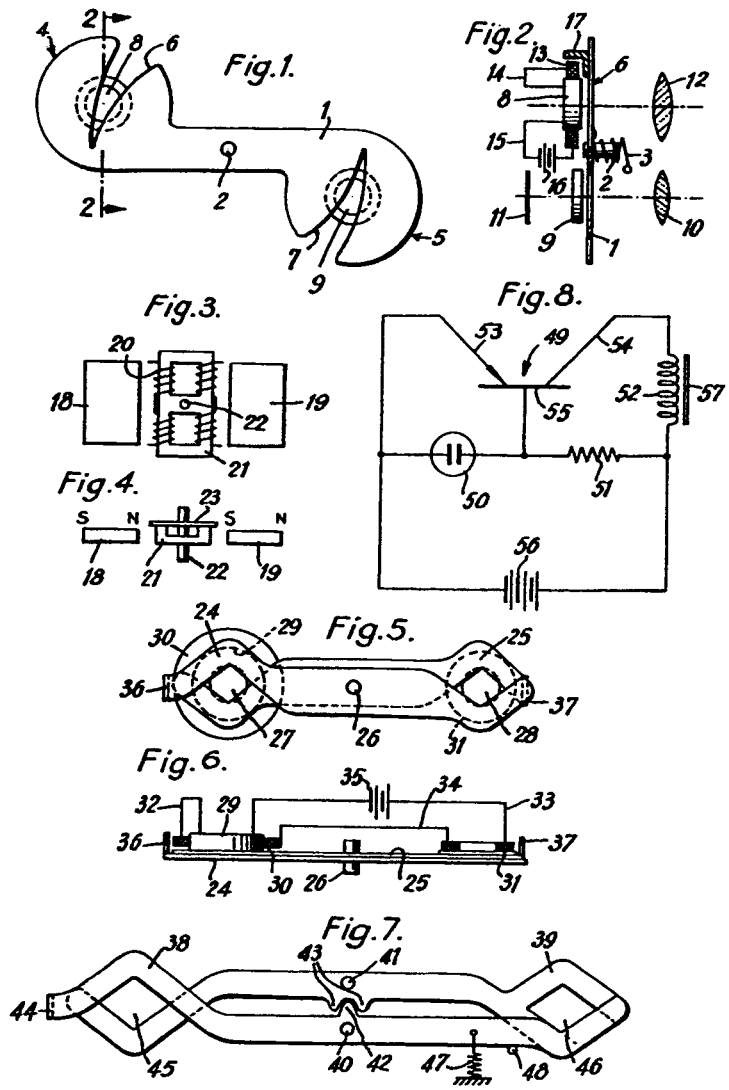

3,116,673
AUTOMATIC REGULATING DEVICE FOR THE LIGHTING OF A PHOTO-SENSITIVE FILM DURING FILMING
Raphaël Bogopolsky, 10 Ave. de Miremont, Geneva, Switzerland
Filed July 27, 1961, Ser. No. 127,210
2 Claims. (Cl. 95—64)

Known automatic, discontinuously operating regulating devices for the lighting of a photo-sensitive film during filming comprise a photo-electric cell which receives the light reflected by the subject which it is desired to fix on the film. Any change in the lighting of the subject entails a change in a current passing through the cell, this current being used to regulate the aperture of the diaphragm disposed between the subject and the object-lens of the filming apparatus.

One has now sought to produce such a device offering several essential advantages over known devices: (a) the characteristics of the photo-electric cell must play a very small part in the operation, the device tending to maintain continuously a constant lighting both of the cell and of the film to be exposed without requiring any relays or mechanically intricate devices; (b) the device must permit a very easy regulation of its sensitivity for various sensitivities of the film, for example by the positioning of a fine mask or a grey filter, without it being necessary to operate on resistances or potentiometers which are always delicate, heavy and cumbersome elements, the accuracy of the response depending upon the initial position of the diaphragm blades at rest; (c) it operates continuously; and (d) it is especially compact.

The device which is the object of the invention is characterized in that it comprises at least one movable blade operating simultaneously as a diaphragm of an objective-lens for filming and as a diaphragm restricting the lighting of a photo-electric cell, the blade being provided with at least one mask, the outlines which determine the aperture of the said diaphragms (this with the advantages (a), (b), (c), and (d) specified above), and an electromagnetic motor comprising at least one winding through which circulates the current passing through the cell and at least one magnet inductively connected to the winding, one of these elements being movable and connected to the moving blade or blades, so that a change of current in the winding due to a change in the lighting of the cell produces a movement of the movable element and of the moving blade or blades, so as to close simultaneously and open simultaneously the two diaphragms and maintain a nearly constant lighting both of the cell and of the film.

One thus obtains a single loop counter-reactive device, any change in the lighting of the subject entailing a modification of the aperture of the diaphragms in the required direction so that the cell and the film maintain a constant lighting the counter-reactive device acting in the same way to avoid oscillations due to motions of the camera.

The accompanying drawing shows, diagrammatically and by way of example, a few embodiments of the device according to the invention as well as a variant.

FIG. 1 is a view in elevation of a first embodiment of the device.

FIG. 2 is a section along line 2—2 of FIG. 1.
FIG. 3 is a plan view of a variant.
FIG. 4 is a view in elevation corresponding to FIG. 3.
FIG. 5 is a view in elevation of a second embodiment of the device.
FIG. 6 is a plan view corresponding to FIG. 5.
FIG. 7 is a view in elevation of a third embodiment of the device.
FIG. 8 is a circuit diagram of a transistor amplifier used with the invention.

The device shown in FIGS. 1 and 2 comprises a non-magnetic moving blade 1, in brass for example, capable of pivoting about a spindle 2. A torsion spring 3 is secured to the moving blade 1 at one of its ends and to a stationary point of the device at the other end. At each of its ends, the moving blade 1 is provided with a mask 4 or 5, the slot 6 or 7 of which has a variable width. The mask 4 is disposed in front of a resistance photo-electric cell 8, and the mask 5 before a collar 9 constituting with a lens 10 a filming objective-lens for a photo-sensitive film 11. The slots 6 and 7 determine the aperture of the diaphragms of the cell and of the objective-lens. The cell 8 is lighted by the subject to be exposed through a lens 12 the role of which will be explained hereafter. A winding 13 is mounted around the cell 8 and coaxial with the latter, the said winding being stationary. The winding is mounted in series with the photo-electric cell 8 by wires 14 and 15, and an electric battery 16 sends a current into the series circuit including the winding, the cell and the wires. The movable blade 1 is provided at the end corresponding to the cell 8 with a permanent magnet 17 which is inductively connected to the winding 13. The winding 13 and the magnet 17 constitute an electromagnetic motor.

The operation of this device is as follows: the blade 1 is shown in FIG. 1 in its middle position, that is to say that it may rotate about the spindle 2 in one direction or the other. Suppose that the lighting of the photo-electric cell 8 increases. In such a case, the electric current passing through the cell increases, thus producing an increase of the magnetic field of the winding 13, causing a movement of the magnet 17 and consequently of the blade 1 in a clockwise direction, looking at FIG. 1, against the action of the spring 3. It follows that the opening 6 of the mask 4 presents in front of the cell 8 a narrower part than previously, thus reducing the lighting of the cell. At the same time, the opening 7 of the mask 5 also presents a narrower part before the collar 9 of the object-lens, so that the luminous flux reaching the film 11 is reduced. It will thus be seen that an increase in the luminosity of the subject is compensated by the device in such a way that the cell and the film receive the light through openings narrower than previously, thus maintaining a constant lighting both of the cell and of the film. If on the contrary the luminosity of the subject is reduced, the current in the cell 8 decreases and the change in the field of the winding 13 which results therefrom causes the blade 1 to rotate in a counterclockwise direction looking at FIG. 1, so that the slots 6 and 7 of the masks 4 and 5 present a larger part opposite the cell 8 and the collar 9, respectively. It follows that the cell 8 and the film 11 receive a larger luminous beam, compensating the reduction of luminous intensity.

In a variant not shown, the winding 13 could be disposed coaxially with the objective-lens, for example around the collar 9. In such a case, the magnet 17 would be secured to the end of the blade comprising the mask 5.

It is preferable to use a photo-electric cell with an amplifying device because of the low potential produced by such cells.

FIGS. 3 and 4 show a variant of the embodiment previously described. In this variant, the electromagnetic motor includes two stationary magnets the polarities of which are indicated in FIG. 4, while the winding 20 is mounted on a movable frame 21 about a spindle 22. The frame 21 is secured to a diaphragm blade 23 similar to the blade 1 of the embodiment described above, including a return spring. The operation of this variant is identical to that described previously, the only difference being that the blade 23 is controlled by the winding movable at the central part thereof and not at one of its ends.

The embodiment shown in FIGS. 5 and 6 comprises two symmetrical blades 24 and 25, of brass for example, capable of pivoting about a common spindle 26. The two blades are shaped at their ends so as to define together two diamond-shaped openings 27 and 28 respectively disposed in front of a resistance photo-electric cell 29 and in front of an objective-lens not shown. A stationary winding 30 is mounted around the cell 29, and a stationary winding 31 is mounted coaxially with the objective-lens. Wires 32, 33 and 34 connect in series the two windings 30 and 31, the cell 29 and a battery 35. The blade 24 is provided with a magnet 36 inductively connected to the winding 30, and the blade 25 is provided with a magnet 37 inductively connected to the winding 31.

The operation of this device is similar to that described for the device of FIGS. 1 and 2. Any change in the lighting of the cell 29 entails a modification of the current in the series circuit described, thus modifying in the same manner the magnetic fields produced by the windings 30 and 31. It follows that the blades 24 and 25 rotate about the spindle 26 in opposite directions. If the lighting of the cell 29 increases, for example, the blade 24 rotates in a counter clockwise direction looking at FIG. 5 and the blade 25 rotates in a clockwise direction, against the action of a return spring. It follows that both the openings are reduced. If the lighting of the cell 29 decreases, the blades will respectively rotate in directions opposite to the preceding ones and the openings 27 and 28 increase. There is thus maintained a constant lighting both of the cell 29 and of the film.

The embodiment shown in FIG. 7 comprises two blades 38 and 39, of brass for example, the blade 38 pivoting about a spindle 40 and the blade 39 about a spindle 41, the two spindles 40 and 41 being close to each other. The blade 38 is provided with a pinion 42 acting with a wheel 43 provided on the blade 39, comprising, respectively, one tooth and two teeth. The blade 38 is provided with a magnet 44. The two blades are shaped so as to define between their ends openings 45 and 46. A return spring 47 for the blades balances the reaction forces of the blades and maintains the diaphragms open as long as the lighting has not reached a determined value, the maximum opening being limited by a stop 48 on a larger aperture as limited by the objective-lens.

This device operates in the same mnaner as the preceding ones. The control of the opening of the diaphragms is effected by an electromagnetic motor not shown which comprises a winding, for example, around the photoelectric cell the lighting of which is controlled by the opening 45. If the lighting of the cell increases as a result of an increase of the luminosity of the subject, the blade 38 rotates in a counter clockwise direction looking at FIG. 7, against the action of the spring 47. The movement of the pinion 42 in the same direction occasions a rotation in the reverse direction of the wheel 43 and the blade 39. It follows that both the openings are reduced. The rotation of the respective blades will take place in the opposite direction if the lighting of the cell is reduced, so as to open both the openings 45 and 46, if need be up to the maximum opening determined by the stop 48, this opening being larger than the maximum opening of the lens.

It is obvious that the current passing through the winding of the electromagnetic motor may be amplified. FIG. 8 shows the diagram of a device comprising an amplification stage constituted by a transistor 49. A photoelectric cell 50. a resistance 51 and a winding 52 are mounted in series between the emitter 53 and the collector 54 of the transistor, the base 55 of which is connected to the circuit between the cell 50 and the resistance 51. The circuit is fed by a battery 56 connected on the one hand to the cell 50 and the emitter 53 and, on the other hand, to the junction of the resistance 51 and the winding 52. A movable magnet 57 constitutes the electromagnetic motor with the stationary winding 52, this magnet being integral with a diaphragm blade of the device.

In the device described, it will be seen that the characteristics of the photo-electric cell have practically no influence on the operation, the action of the electromagnetic motor bearing symmetrically on the diaphragm regulating the lighting of the cell and on the diaphragm regulating the lighting of the photo-sensitive film. Moreover, the device requires neither an adjustable resistance nor a regulating potentiometer which are employed in known devices for regulating the sensitivity of the device nor any intricate mechanical device. This sensitivity may be regulated very easily by a fine mask or a grey filter which may be placed, for example, between the lens 12 and the subject to be photographed or filmed in the device shown in FIGS. 1 and 2. The accuracy of the device depends upon the dead angle created by the blades between the rest position and the operating diaphragm closing position.

What I claim is:

1. In an automatic regulating device for the lighting of a photo-sensitive film during filming which comprises a continuously operating, single loop counter-reactive regulating device, the combination comprising a photo-electric cell, at least one movable blade acting simultaneously as a diaphragm of an objective-lens for filming and as a diaphragm restricting the lighting of said photo-electric cell, said at least one blade being provided with at least two masks the profiles of which define the apertures of the said diaphragms, a single current supply source, and an electromagnetic motor comprising at least one winding traversed by the current from said supply source passing through the cell and at least one magnet inductively connected to the winding, one of the motor elements being movable and connected to the diaphragm blade or blades, so that a change in the current in the winding due to a change in the lighting of the cell produces continuously a movement of the movable element and of the blade or blades, so as to close simultaneously and open simultaneously the two diaphragms and maintain a constant lighting both of the cell and of the film.

2. An automatic counter-reactive means for regulating the lighting of a photo-sensitive film during filming, said regulating means being continuously operative and comprising a stationary photo-electric cell, an objective-lens for filming, at least one movable blade diaphragm means rotatably mounted adjacent to said cell and to said objective-lens acting simultaneously as a diaphragm of said objective-lens and as a diaphragm restricting the lighting of said photo-electric cell, at least two masks disposed on each blade diaphragm means and having profiles which define the apertures of said diaphragms, an electromagnetic motor comprising at least one winding and at least one magnet inductively coupled to the winding, one of said motor elements being mounted on said movable blade diaphragm means, and a single current source connected in series with said photo-electric cell and said winding, so that a change in the lighting of said cell causes a change in the current in said winding which continuously produces a movement of the movable motor element and thus of the blade diaphragm means, said blade diaphragm means thereby closing simultaneously and opening simultaneously said diaphragms and maintaining a constant lighting both of the cell and of the film.

References Cited in the file of this patent

UNITED STATES PATENTS

| | | |
|---|---|---|
| 2,576,813 | Simons | Nov. 27, 1951 |
| 2,956,491 | Fischer | Oct. 18, 1960 |
| 2,960,016 | Distel | Nov. 15, 1960 |
| 2,974,578 | Wittel | Mar. 14, 1961 |
| 2,995,996 | Gossen | Aug. 15, 1961 |
| 3,000,280 | Faulhaber | Sept. 19, 1961 |
| 3,024,715 | Wittel | Mar. 13, 1962 |

FOREIGN PATENTS

| | | |
|---|---|---|
| 1,182,694 | France | Jan. 19, 1959 |